Figure 1:
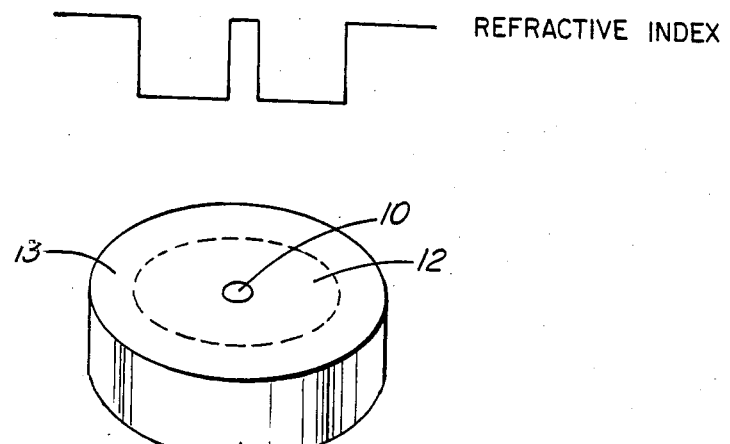

United States Patent [19]
Pilon et al.

[11] Patent Number: 4,734,117
[45] Date of Patent: * Mar. 29, 1988

[54] OPTICAL WAVEGUIDE MANUFACTURE

[75] Inventors: Peter J. Pilon, Nepean; Richard S. Lowe, Kanata, both of Canada

[73] Assignee: Northern Telecom Limited, Montreal, Canada

[*] Notice: The portion of the term of this patent subsequent to Feb. 17, 2004 has been disclaimed.

[21] Appl. No.: 42,567

[22] Filed: Mar. 30, 1987

Related U.S. Application Data

[63] Continuation of Ser. No. 745,778, Jun. 17, 1985, abandoned.

[30] Foreign Application Priority Data

Mar. 19, 1985 [CA] Canada .................... 476844

[51] Int. Cl.⁴ .................................. C03P 37/018
[52] U.S. Cl. ........................ 65/3.12; 65/18.2; 65/DIG. 16
[58] Field of Search .......... 65/3.12, DIG. 16, 3.11, 65/3.15, 18.2, 900

[56] References Cited

U.S. PATENT DOCUMENTS

| | | | |
|---|---|---|---|
| 3,868,170 | 2/1975 | De Luca | 65/18.2 X |
| 3,933,454 | 1/1976 | De Luca | 65/3.12 |
| 4,402,720 | 9/1983 | Edahiro | 65/18.2 X |
| 4,493,721 | 1/1985 | Auwerda | 65/DIG. 16 |
| 4,557,561 | 12/1985 | Schneider | 65/18.2 X |

FOREIGN PATENT DOCUMENTS

| | | | |
|---|---|---|---|
| 3031160 | 4/1982 | Fed. Rep. of Germany | 65/DIG. 16 |
| 3230199 | 2/1984 | Fed. Rep. of Germany | 65/DIG. 16 |
| 2504514 | 10/1982 | France | 65/DIG. 16 |
| 55-67533 | 5/1980 | Japan | 65/DIG. 16 |
| 56-50136 | 5/1981 | Japan | 65/DIG. 16 |

*Primary Examiner*—Kenneth M. Schor
*Attorney, Agent, or Firm*—Schwartz, Jeffery, Schwaab, Mack, Bleumenthal & Evans

[57] ABSTRACT

Optical waveguide having a fused silica core and a fluorine doped fused silica cladding is made by depositing particulate core silica onto a support tube and then drying and densifying the silica. Further particulate cladding silica is deposited and is heated in a fluorine containing gas to effect drying, fluorine diffusion into and sintering the cladding silica. The support tube is etched away and the resulting tubular preform is heated to collapse it into a rod from which waveguide is drawn, the waveguide having a fluorine doped silica cladding.

6 Claims, 8 Drawing Figures

OPTICAL WAVEGUIDE MANUFACTURE

This application is a continuation of application Ser. No. 745,778 filed June 17, 1985, now abandoned.

The invention relates to a method for manufacturing optical waveguide. It has particular application to the manufacture of optical waveguide having a fluorine doped silica cladding and a pure or doped silica core.

Optical waveguide having a pure silica core and a fluorine doped silica cladding is described in U.S. Pat. No. 4,082,420 (Shiraishi et al). The optical waveguide is made by a flame hydrolysis method in which silicon tetrachloride and silicon tetrafluoride are fed to an oxygen-hydrogen burner to form a flourine doped silica soot which is deposited onto the surface of a vitreous silica rod. The rod and deposited soot are then heated to consolidate the soot into a composite glass preform and fiber is drawn from the preform.

Using the flame hydrolysis method, it has proven difficult to entrain sufficient fluorine into the deposited silica. The fluorine lowers the refractive index of the silica but the dopant content in the cladding must be sufficient to lower the refractive index of silica from about 1.4585, being that of pure silica, to about 1.4550 or less in order that a fiber having a pure silica core and a doped silica cladding will function as a waveguide.

Our copending Canadian patent application Ser. No. 476,843, in the name of Koichi Abe and entitled OPTICAL WAVEGUIDE MANUFACTURE, describes an alternative method of fabricating a fluorine doped silica clad fiber. In the method a fluorine doped silica cladding is made by heating a cylinder of silica in a fluorine-containing atmosphere, the cylinder initially having an outer annular particulate or porous region deposited over a core region of fused silica. The fluorine diffuses into this porous annular region to both dry and lower the refractive index of the porous silica which is subsequently fused. The cylinder is made by depositing particulate core silica onto a mandrel, removing the mandrel, drying the silica in chlorine, and heating the silica to densify it. Further particulate silica is deposited and is then heated in a fluorine-containing gas to dry, fluorine diffuse, and sinter the porous outer part of the silica. The resulting tubular silica preform is heated to collapse the tubular preform into a rod from which optical waveguide is drawn, the waveguide having a fluorine doped silica cladding. The particular silica can be subjected to a chlorine drying step before fluorine drying, diffusion and sintering.

A preferred mandrel was composed of a graphite rod, the rod being removed after depositing the core silica. The rod was removed by twisting the deposited silica tube to break the seal between the tube and the mandrel, the mandrel then being withdrawn along the axis of the tube.

One disadvantage of using a graphite mandrel is that particles of graphite can remain within the deposited silica tube and impurities out-diffusing from the graphite during subsequent heating steps can impregnate the silica tube. The same disadvantage results from using a carbon coated rod which has been proposed as an alternative. A further problem in the method previously disclosed is that the initially deposited thin-walled core silica tube can be distorted in shape since the supporting graphite mandrel is absent during the sintering step when the temperature reaches about 1600°.

To overcome these disadvantages there is proposed according to the present invention a method of manufacturing optical waveguide comprising depositing particulate core silica onto a cylindrical mandrel, drying the particulate core silica and then fusing the silica to form a cylindrical silica substrate, forming a further layer of particulate cladding silica on the cylindrical silica substrate, diffusing fluorine into the particulate cladding silica layer, heating the silica to cause consolidation and collapse of the core and cladding silica into a fused rod preform, heating the rod preform to a drawing temperature and, drawing optical waveguide from the rod preform, such waveguide having a cladding part derived from the deposited particulate cladding silica and a core part derived from the substrate silica, the improvement comprising said mandrel being a fused silica support tube which is etched away prior to collapse of the silica into a fused rod preform by passing an etchant within the support tube.

In a preferred embodiment, the silica support tube remains until immediately before consolidation and collapse into the fused silica preform. Particularly in manufacturing single mode waveguide a outer silica tube is collapsed down onto the preform after sintering the cladding silica. The preform obtained is then relatively massive and the processes of etching away the initial support tube and collapsing the tubular preform to a rod are relatively slow because of the problem of heating the center of the preform. The support silica tube can be etched using a silica etchant such as a mixture of sulphur hexafluoride and helium. As the etchant is passed through the support tube the support tube together with the deposited silica is subjected to passes of a burner flame. Using the embodiment, there is no risk of introducing moisture into the core and cladding while they are porous or into the cladding surface when sintered since the outer silica tube protects the core and cladding regions from the wet flame during the final steps.

The support tube can alternatively be etched away at an earlier stage such as immediately after consolidation of the first-deposited or core silica. The core silica can then be collapsed into a rod before deposition, drying and fluorine diffusion of the outer or cladding silica. Also, at an early stage of processing, the quality and thickness of the core silica can be assessed to see whether it is worth depositing further cladding silica and to determine how much cladding silica should be deposited to obtain a desired core/cladding thickness ratio.

However in this alternative the cylinder of core silica must be relatively large to be self supporting. As indicated previously all high temperature processing steps other than silica deposition are preferably implemented within a tubular silica chamber to which the desired ambient temperature is supplied and heat is applied to the outside of that chamber rather than directly to the deposited silica. It is difficult to accommodate a large core cylinder in such a chamber and still develope a high enough temperature for sintering to occur. The cylinder of core silica must therefore be heated directly to consolidation using an oxygen-hydrogen torch. Unfortunately use of direct heating introduces the highly attenuating OH group into an outer layer of the core silica cylinder and this layer must be etched away before subsequent processing using a HF:H$_2$O etchant.

One embodiment of the invention will now be described with reference to the accompanying drawings in which:

FIG. 1 shows the end part of an optical waveguide made by a method according to the invention, the Figure also illustrating a refractive index profile across the fiber; and FIGS. 2 to 8 are schematic views of stages in the manufacture of optical waveguide by one method according to the invention.

Referring to FIG. 1, an optical fiber has a core 10 of high purity fused silica, a cladding 12 of fluorine doped silica, and a silica jacket 13. The optical fiber has an outer diameter of 125 microns with a core diameter of about 9 microns for single mode fiber and about 50 microns for multimode fiber. The fluorine is present in an amount sufficient that the refractive index of the cladding region is 1.4550 or less compared to 1.4585 for the core region.

To make a fiber having the structure and composition shown in FIG. 1, a cylindrical preform is made from particulate silica. The preform is dried and fluorine is diffused into an outer porous region of the preform. The preform is then consolidated into a fused silica rod from which fiber is drawn, the fiber having a relatively low refractive index cladding corresponding to the fluorine doped region.

Referring particularly to FIGS. 2 to 8, FIG. 2 shows a tubular fused silica support tube 14, 50 centimeters in length with an internal diameter of 4 millimeters and an external diameter of 6 millimeters. The ends of the silica support tube are fixed into spaced chucks 17 of a lathe. A silica soot producing burner 18 is mounted to direct a flame at the support tube 14. Silicon tetrachloride entrained within a stream of oxygen by bubbling the oxygen through the silicon tetrachloride is fed to a central tubular chamber within the burner 18. Argon, which separates the silicon tetrachloride vapour from the burner gases within the burner itself is fed to a second surrounding annular chamber, hydrogen to a third annular chamber, and a mixture of argon and oxygen is fed to an outer burner chamber. The flow rates are 2 to 3 liters per minute of oxygen to the first chamber, 2 liters per minute of argon to the second chamber, 10 liters per minute of hydrogen to the third chamber and 15 liters per minute of argon with 3 liters per minute of oxygen to the outer chamber. The burner is moved along the length of the support tube at 8 centimeters per minute and the support tube 14 is rotated at 30 revolutions per minute.

Particulate core silica is deposited onto the support tube 14 to a diameter of 1.2 centimeters and at a rate of growth which depends on the diameter of the support tube as supplemented by previously deposited particulate silica. The deposited silica has a very high moisture content. This is untenable if the silica is to function as the core of an optical waveguide since the moisture results in a large absorption peak near 1400 nanometers. This reduces the transmission at 1300 and 1550 nanometers which are the output wavelengths of long wavelength light emitting devices of interest in fiber optic communications systems.

Figure 3:
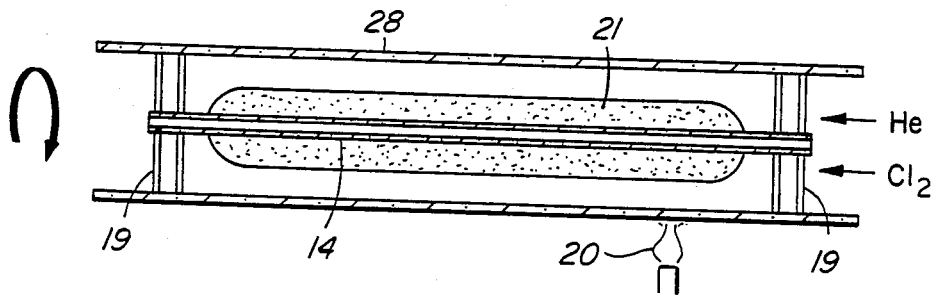

To remove this OH moisture absorption peak, the particulate silica is dried in a chlorine-containing atmosphere at high temperature. As shown in FIG. 3, the support tube 14 together with deposited silica 21 is mounted within a 16 millimeter internal diameter silica tube 28 using apertured Teflon (Trademark) spacers 19 which permit the tube 28 to be rotated with the support tube 14 held centrally. A mixture of chlorine (200 cubic centimeters per minute) and helium (200 cubic centimeters per minute) is then piped through the tube 28 and a burner flame 20 is directed at the outside of the tube 28 to establish a hot zone temperature of 1300° C. The torch is passed several times along the tube 28 in the direction of flow of the gas mixture. Torch traversal takes place at 8 centimeters per minute for a time of 60 minutes. During this period the porous silica 21 shrinks to about 0.9 centimeters in diameter corresponding to densification from an initial value of about 0.35 grams $cm^{-3}$ to a final density of about 0.8 grams $cm^{-3}$. Hydrogen contained within the porous silica as the hydroxyl species reacts with the chlorine to produce volatile hydrogen chloride and is removed. Excess chlorine and hydrogen chloride are exhausted from the tube leaving only chlorine within the particulate silica. Removal of hydroxyl species renders subsequently formed fused silica very highly transmissive.

In a subsequent sintering or consolidation step, the burner traversal rate is reduced to 0.2 centimeters per minute and the gas applied to the burner is altered to obtain a hot zone temperature of about 1600° C. After a one hour burner traversal period, the soot is consolidated to a chlorine free fused silica tube 27 about 30 centimeters in length having an external diameter of 0.65 centimeters. A back pressure generating device can be used at the exhaust end of the tube 28 to prevent the tube from shrinking in diameter at high temperature.

Figure 4:
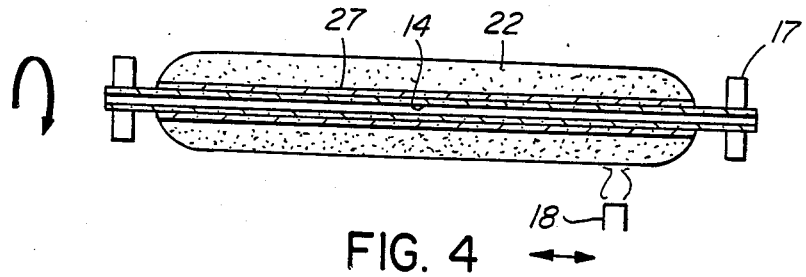

Referring to FIG. 4, the silica tube 14 is mounted between quartz chucks 17 and further particulate silica 22 is deposited onto the densified silica 27 using the burner 18. The particulate silica 22 is deposited to a diameter of 2.4 centimeters with a density of 0.35 grams $cm^{-3}$.

Figure 5:
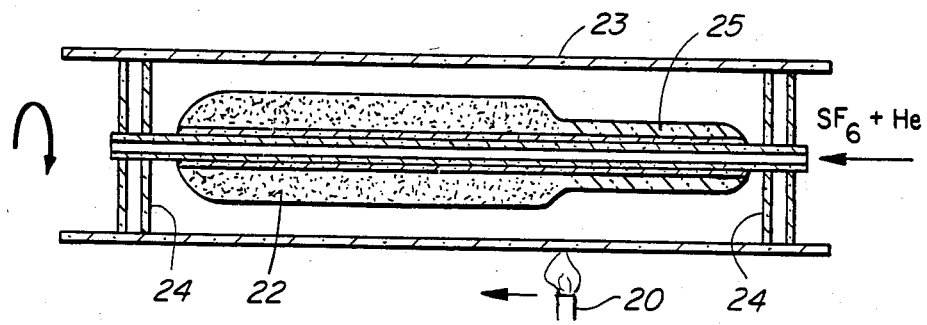

When silica deposition is complete, the support tube 14, which supports the core and cladding silica, is placed within a fused silica tube 23 having an inside diameter of 2.8 centimeters and a 1 millimeter wall thickness (FIG. 5). The tube is mounted between apertured Teflon discs 24 which permit tube rotation. The porous silica 22 is then simultaneously dried and doped with fluorine by passing along the tube 23 a mixture of helium (180 cubic centimeters per minute) and sulphur hexafluoride (45 cubic centimeters per minute). A single burner pass is made in the direction of gas flow at a traversal rate of 0.4 centimeters per minute and a hot zone temperature in the range 1450° to 1550° C. Because of the presence of fluorine in the porous silica, the sintering temperature is lower than that of pure silica. Consequently the heat pass not only dries and dopes the silica but causes sintering as shown at region 25. A fused silica tube is produced having an external diameter of 1.1 centimeter. An outer annular region of the tube is doped with fluorine to a level at which the doped silica refractive index is 1.4520 compared to 1.4585 for the pure silica in the central region. The refractive index difference of 0.0065 is suitable for making multimode optical waveguide.

Although it is convenient to perform the drying and fluorine doping steps simultaneously, the steps can in fact be performed successively in which case an alternative drying agent such as chlorine can be used. By using the chlorine and fluorine drying techniques at various stages in the fabrication process, a moisture level of less than 0.1 parts per million in the fused silica is achieved.

Figure 6:
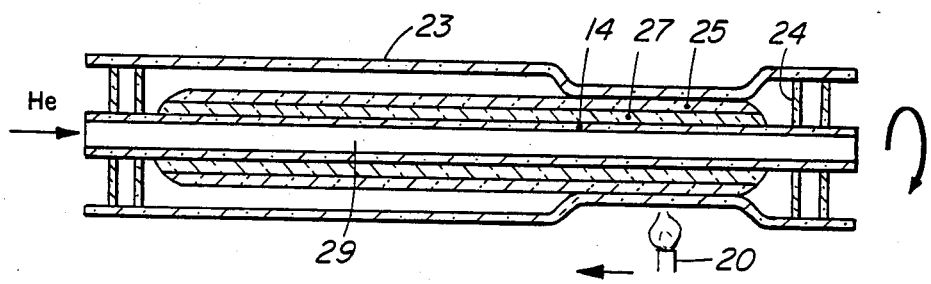
Figure 7:
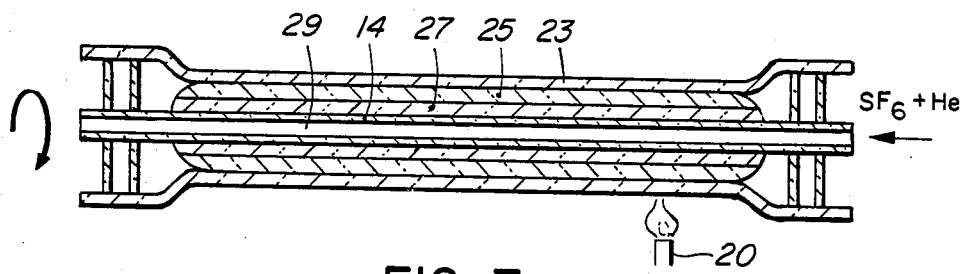

The diameter of the tubular preform is then increased from about 1.1 centimeter to about 1.5 centimeters by adding the silica jacket 13 (FIG. 1). To do this the tube 23 in which the preform is mounted is simply heated to collapse it down onto the outside of the fluorine doped silica 25. As shown in FIG. 6, the tube 23 collapses along a central region but is maintained open at its ends. The composite preform obtained has a small bore 29 through its center. As shown in FIG. 7, a mixture of sulphur hexafluoride and helium in the volume ratio 10%:90% is then passed down bore 29. At the same time, the preform is subjected to a number of passes of the burner 20 at about 1 centimeter per minute to establish a temperature at the center of the preform of about 1200° C. At this temperature the silica of the initial support tube 14 is etched away. To accurately gauge the amount of material removed and to prevent the removal of deposited core silica 27, the preform is periodically weighed or the cross-section is optically monitored. Once the initial support tube 14 has been fully etched away, the composite tubular preform is collapsed by heating to a temperature in the range 1850° to 1900° C. and traversing the burner at 1 centimeter per minute towards the inlet end while maintaining a clean helium atmosphere in the bore 29.

The composition of the support tube 14 can be silica doped, for example, with the OH group to improve etchability. However care must be taken to ensure that impurity is not absorbed into the core and cladding silica 27 and 35 while they are porous. Moreover any impurity used should not cause a marked change in the coefficient of thermal expansion of the silica since otherwise there will be untenable stress introduced at the support tube/core silica interface during temperature fluctuations associated with processing.

As indicated previously the support tube 14 can be etched away at an earlier stage in the process. The core silica 27 can then be collapsed into a rod to form a substrate for cladding silica deposition. The slow, high temperature step of collapsing the central bore 29 of the full size tubular preform is thus obviated.

Figure 2:
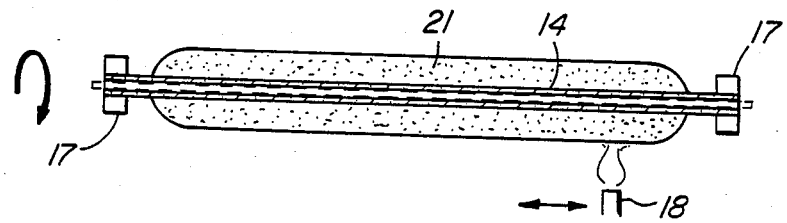

As shown in FIG. 2, in phantom, a 4 millimeter outside diameter rod made of a refractory material such as graphite or alumina ($Al_2O_3$) can be temporarily inserted into the tube 14 to reduce warpage. The presence of such a refractory liner permits high temperature of the core silica to be achieved without destroying the cylindrical nature of the preform.

Figure 8:
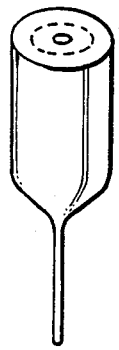

Referring to FIG. 8, the composite rod preform finally obtained is subsequently placed in a vertical orientation drawing tower having a furnace zone at which the preform temperature is raised to about 2000° C. which is higher than the silica softening point. Fiber is pulled from the lower end of the preform by a drum onto which the fiber is wound after being cooled and coated with a protective acrylate or silicone layer. The fiber has a high purity silica core and a relatively lower refractive index fluorine doped silica cladding.

The waveguide produced using the dimensions indicated is multimode fiber having a core diameter of about 50 microns, a combined cladding and jacket diameter of about 80 microns, and an overall diameter of 125 microns. As previously indicated the refractive index difference is approximately 0.007. Monomode fiber, in contrast has a smaller core of the order of 9 microns in diameter and a refractive index difference of approximately 0.0035. To modify the method for monomode fiber, the core:cladding diameter ratio is reduced. One way of achieving this is merely by depositing more particulate cladding silica at the stage described with reference to FIG. 4. Another method is to etch away some of the core silica bounding the bore 29, following removal of the support tube 14. A refractive index difference of the order of 0.0035 is achieved by doping the porous cladding silica to a lower level by increasing the ratio of helium in the helium:sulphur hexafluoride mixture used during the fluorine drying/doping stage of FIG. 5. The amount of fluorine necessary to lower the refractive index of silica to 1.452 is about the limiting level at which fluorine can be incorporated into silica using this method. To obtain a refractive index difference larger than 0.007 for a silica based fiber, the refractive index of the core can be increased above the value of that of the pure silica. Most dopants increase the refractive index of silica, so by incorporation of the dopant material within the silica initially deposited onto the support tube 14 the refractive index of the resulting waveguide core is increased above that of pure silica. Germanium can be included within the silica initially deposited by entraining germanium tetrachloride with silicon tetrachloride injected into the silica soot producing burner 18.

As described in our co-pending Canadian application Ser. No. 463,378, the core and cladding silica can be deposited in other ways. For example the porous cladding silica can be deposited immediately following the porous core silica with a density less than that of the core silica. Following chlorine drying of all the deposited silica, the cladding silica is subjected to fluorine drying, diffusion and sintering. Because the core silica is deposited in a relatively dense condition, the fluorine diffuses only into the cladding silica. In other respects the method is the same as that described previously.

In a further alternative process, the core and cladding particulate silica is deposited with uniform porosity onto the fused silica support tube. The preform is dried in chlorine and then subjected to RF heating using a coil surrounding the preform so as to concentrate heat near its center. This causes partial fusion of the particulate silica in the inner preform section compared to that in the outer preform section. Fluorine is diffused into the outer preform section following densification of the inner preform section by the RF heating and partial fusion. In other respects the method is the same as that described with respect to the process embodiment of FIGS. 2 to 8.

What is claimed is:

1. A method of manufacturing optical waveguides comprising:
    depositing a layer of particulate silica on an outer surface of a fused silica cylindrical support tube having a central bore;
    drying the deposited silica;
    consolidating the dried, deposited silica;
    depositing another layer of particulate silica on the dried consolidated silica to form a preform having a porous outer layer;
    placing said preform having a porous outer layer within a second fused silica tube, and drying and fluorine doping said preform having a porous outer layer by passing a fluorine-containing gas through said second fused silica tube and around said preform having a porous outer layer to form a preform having a doped porous outer layer;
    consolidating said preform having a doped porous outer layer to form a preform having a doped outer layer and heating said second fused silica tube to collapse it onto said preform having a doped outer layer;

etching away the fused silica cylindrical support tube by passing a mixture of hexafluoride and helium through the central bore, resulting in a tubular preform composite;

collapsing said composite tubular preform into a rod preform; and heating said rod preform to a drawing temperature and drawing it into an optical waveguide, said waveguide having a core and a cladding derived from deposited silica, with the cladding being doped with fluorine.

2. A method as claimed in claim 1 in which the support tube is made of fused silica doped with a material which renders the silica more easily etchable than pure silica.

3. A method as claimed in claim 1 in which etching is continued after removal of the support tube so as to etch away a portion of the deposited silica on the outer surface of the fused silica cylindrical support tube.

4. A method as claimed in claim 1 in which the support tube is mounted between spaced chucks during deposition of particulate silica on the outer surface of the fused silica cylindrical support tube.

5. A method as claimed in claim 1 in which during the step of depositing a layer of particulate silica on an outer surface of a fused silica cylindrical support tube, a refractory liner rod is positioned within the support tube.

6. A method as claimed in claim 1 in which during the first step of consolidating, a refractory liner is positioned within the support tube.

* * * * *